United States Patent
Cho et al.

(10) Patent No.: US 6,818,092 B2
(45) Date of Patent: Nov. 16, 2004

(54) MULTI-LAYER ELECTRET HAVING ULTRA-HIGH CHARGE STABILITY AND METHOD OF MANUFACTURING THEREOF

(75) Inventors: Keum-Haeng Cho, Bucheon-si (KR); Won-Taek Lee, Inchon (KR)

(73) Assignee: BSE Co., Ltd., Inchon (KR)

( * ) Notice: Subject to any disclaimer, the term of this patent is extended or adjusted under 35 U.S.C. 154(b) by 66 days.

(21) Appl. No.: 10/135,033

(22) Filed: Apr. 29, 2002

(65) Prior Publication Data

US 2003/0113546 A1 Jun. 19, 2003

(30) Foreign Application Priority Data

Dec. 13, 2001 (KR) ........................................ 2001-78993

(51) Int. Cl.⁷ ............................................. B32B 31/20
(52) U.S. Cl. ...................... 156/309.6; 156/324; 29/886; 307/400
(58) Field of Search .................. 29/594, 886; 381/173, 381/191; 264/436; 307/400; 156/308.2, 309.6, 324

(56) References Cited

U.S. PATENT DOCUMENTS

| 4,014,091 A | * | 3/1977 | Kodera et al. | ................. | 29/886 |
| 4,302,633 A | * | 11/1981 | Tamamura et al. | ......... | 307/400 |
| 4,640,866 A | * | 2/1987 | Suzuki | ........................ | 428/422 |
| 5,198,053 A | * | 3/1993 | Duncan | ........................ | 156/64 |

FOREIGN PATENT DOCUMENTS

| EP | 160439 A2 | * | 11/1985 | ........... | B32B/15/08 |

* cited by examiner

*Primary Examiner*—Jeff H. Aftergut
*Assistant Examiner*—John L. Goff
(74) *Attorney, Agent, or Firm*—F. Chau & Associates, LLC

(57) ABSTRACT

A multi-layer electret that can endure a high temperature so as to be processed by surface mount technology (SMT) and has ultra-high charge stability and a method of manufacturing thereof are provided. The multi-layer electret is constructed in such a manner that an FET film of 12.5 $\mu$m~25 $\mu$m in thickness melting-adheres to a surface of a metal plate, and a PTFE film of 30 $\mu$m~100 $\mu$m in thickness melting-adheres to the surface of the FEP film. A method of manufacturing the multi-layer electret having ultra-high charge stability comprises a first step of laminating an FEP film on a metal plate; a second step of heating the metal plate on which the FEP film was laminated at a high temperature and applying high pressure thereto, whereby the FEP film and the metal plate melting-adhere to each other; a third step of laminating a PTFE film on the FEP film attached to the metal plate; a fourth step of heating the laminated structure and applying high pressure thereto, whereby the PTFE film melting-adheres to the FEP film; a fifth step of cooling the resulting structure, to accomplish an electret; and a sixth step of charging the cooled electret with charges.

3 Claims, 4 Drawing Sheets

MULTI-LAYER ELECTRET HAVING ULTRA-HIGH CHARGE STABILITY AND METHOD OF MANUFACTURING THEREOF

BACKGROUND OF THE INVENTION

1. Field of the Invention

The present invention generally relates to an electret used for a condenser microphone and a method of manufacturing thereof, more specifically, to a multi-layer electret that can endure a high temperature so as to be able to be processed by surface mount technology (SMT) and has ultra-high charge stability and a method of manufacturing thereof.

2. Description of the Related Art

In general, microphones are classified, based on a method of converting mechanical vibration into electric signals, into a carbon microphone using electrical resistance characteristic of carbon grains, a crystal microphone using piezo-electricity effect of rochelle salt, a moving-coil microphone that vibrates a diaphragm having a coil in the magnetic field to generate induced current, a velocity microphone that uses a phenomenon that induced current is created when a metal leaf set within the magnetic field receives a sound wave to vibrate, and a condenser microphone that uses a variation in capacitance caused by vibration of a film by a sound wave.

The condenser type is widely used as a small-size microphone. However, this needs DC power (battery) for applying a voltage to a condenser. To solve this problem, an electret condenser microphone using an electret having quasi-permanent charges has been recently employed. Since the electret microphone does not require a bias voltage, its pre-amplifier is simplified and its performance can be improved with low costs.

Meanwhile, with development of manufacturing techniques of electronic products, all the products are becoming small-sized. To manufacture these small-size products, surface mount technology (SMT) is widely used. The SMT is a process or a system that places components on a printed circuit board (PCB). The surface-mounted component have very small leads so as to be connected (welded) to lands provided on the PCB or do not have the leads. Although the price and performance of a product can be improved when the SMT is applied to manufacture the product, the SMT cannot be applied to components that are vulnerable to a high temperature because a high temperature is applied to them during reflow process.

A conventional electret used for a condenser microphone is made of fluoro-Ethylene-Propylene (FEP), as shown in FIG. 1. However, FEP is vulnerable to a high temperature so that SMT cannot be used for manufacturing the electret. Therefore, production costs of various products using the microphone, for example, a cellular phone terminal, cannot be reduced. Specifically, the conventional electret 16 is made of an FEP film 12 that is laminated on a metal plate 11, and a back electret structure is constructed by forming a space with a diaphragm 17 configured in a manner that a metal 15 is coated on a PET 14 and a spacer 13. The FEP film 12 is formed by melting-extrusion so that there are limitations in increasing crystallinity thereof. In addition, among physical characteristics of the material of the FEP film, the melting point is 260° C. approximately. It means that it becomes liquid at a low temperature. Accordingly, it is difficult to manufacture the electret that is processed by SMT using the FEP film.

To solve the above-mentioned problem, $SiO_2$, $Si_3N_4$, and the like have been developed as materials of electrets that can endure a high temperature as a result of steady research and development. However, a manufacturing process of electrets using these materials is complicated and manufacturing cost is high because they are ceramic materials. Furthermore, a charging process, which is a process of converting a dielectric into electrets, is difficult to perform because of high density of ceramic material. Even if the electrets are charged, only their surfaces are charged so that the quantity of electric charges are decreased very easily when humidity or other impurities come into contact with the surfaces of the electrets. Therefore, the above-mentioned materials have a problem that they are vulnerable to moisture or surrounding environments though they can endure heat.

SUMMARY OF THE INVENTION

It is, therefore, an object of the present invention to provide a polymer electret having ultra-high charge stability that can endure a high temperature and humidity.

Another object of the present invention is to provide a method of manufacturing the above-mentioned electret for SMT.

To accomplish the objects of the present invention, there is provided a multi-layer electret that is constructed in such a manner that an FEP film of 12.5 $\mu$m~25 $\mu$m in thickness melting-adheres to a surface of a metal plate, and a PTFE film of 30 $\mu$m~100 $\mu$m in thickness melting-adheres to the surface of the FEP film.

The present invention further provides a method of manufacturing a multi-layer electret having ultra-high charge stability, comprising a first step of laminating an FEP film on a metal plate; a second step of heating the metal plate on which the FEP film was laminated at a high temperature and applying high pressure thereto, whereby the FEP film and the metal plate melting-adhere to each other; a third step of laminating a PTFE film on the FEP film attached to the metal plate; a fourth step of heating the laminated structure and applying high pressure thereto, whereby the PTFE film melting-adheres to the FEP film; a fifth step of cooling the resulting structure, to accomplish an electret; and a sixth step of charging the cooled electret with charges.

BRIEF DESCRIPTION OF THE DRAWINGS

Further objects and advantages of the invention can be more fully understood from the following detailed description taken in conjunction with the accompanying drawings, in which.

DETAILED DESCRIPTION OF THE PREFERRED EMBODIMENT

The present invention will now be described in connection with preferred embodiments with reference to the accompanying drawings.

Figure 1:
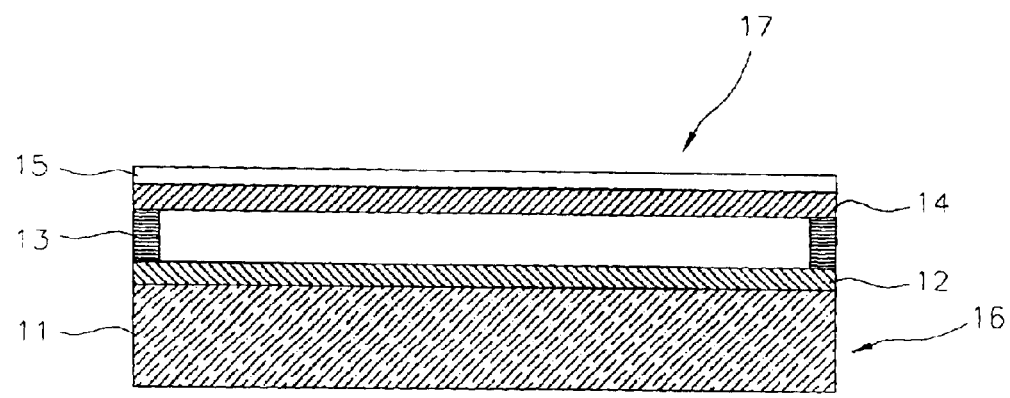
FIG. 1 illustrates the structure of a back electret used for a conventional microphone.
Figure 2:
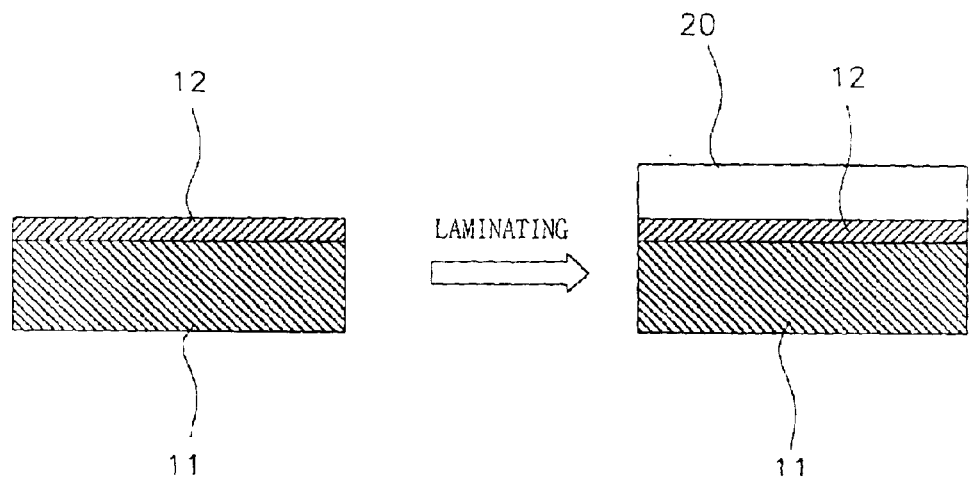
FIG. 2 illustrates the manufacturing concept of a multi-layer electret according to the present invention.

Referring to FIG. 2, a polymer electret having ultra-high charge stability according to the present invention is manufactured in such a manner that an FEP film 12 of 12.5~25 μm in thickness is attached onto a metal plate 11, and a polytetrafluoro-ethylene (referred to as PTFE hereinafter) film 20 having high crystallinity of 30~100 μm in thickness is laminated on the FEP film 12. Accordingly, a multi-layer electret is constructed.

The electret made of the FEP film and the PTFE film can be processed by SMT because it has high crystallinity. The PTFE film is formed by a process that is totally different from a manufacturing method of the FEP film.

The FEP film is difficult to form to have high crystallinity because it is formed by melting extrusion. Even if it has high crystallinity, one grain thereof becomes large so that fine grains cannot be formed all over the film. Accordingly, there are limitations in improving charge stability of the FEP film. However, the PTEF film is formed in a manner that a PTEF resin is shaped and a shaped body is sliced thin so that a large amount of fine grains can be formed all over the film, resulting in improvement in crystallinity and charge stability. The PTEF resin is a mass of microscopic grains each of which has the size of 10~20 μm. So the grains become further microscopic by being given strong pressure and heat during shaping.

Figure 3:
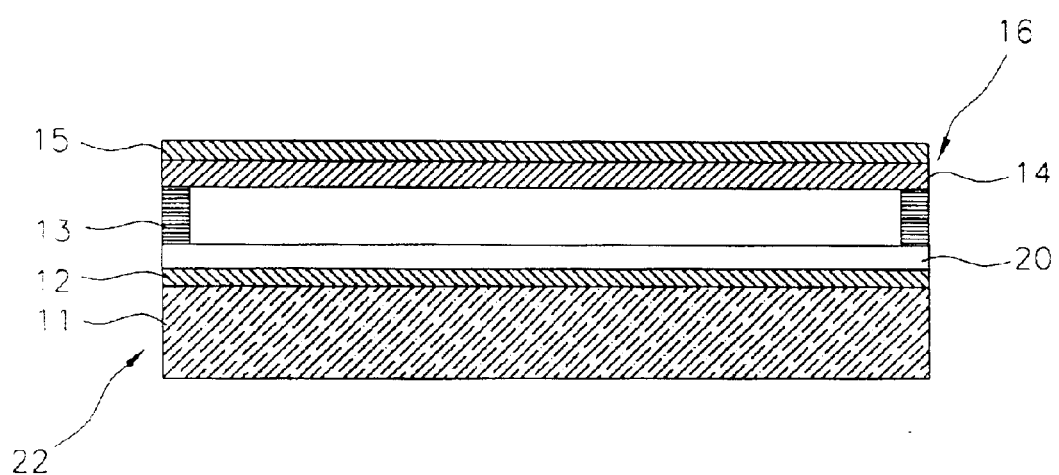
FIG. 3 illustrates the structure of a back electret according to the present invention.

Referring to FIG. 3, a back electret used for a microphone that is manufactured using the electret formed as described above is configured of an electret 22 constructed in a manner that the FEP film 12 and the PTFE film 20 are laminated on the metal plate 11, a diaphragm 17 formed in a manner that a metal film 15 is laminated on a polyethylene-terephtalate film 14, and a spacer 13 for forming a space between the diaphragm 17 and the electret 22. The back electret constructed as above converts sound pressure into electric signals in a microphone.

Figure 4:
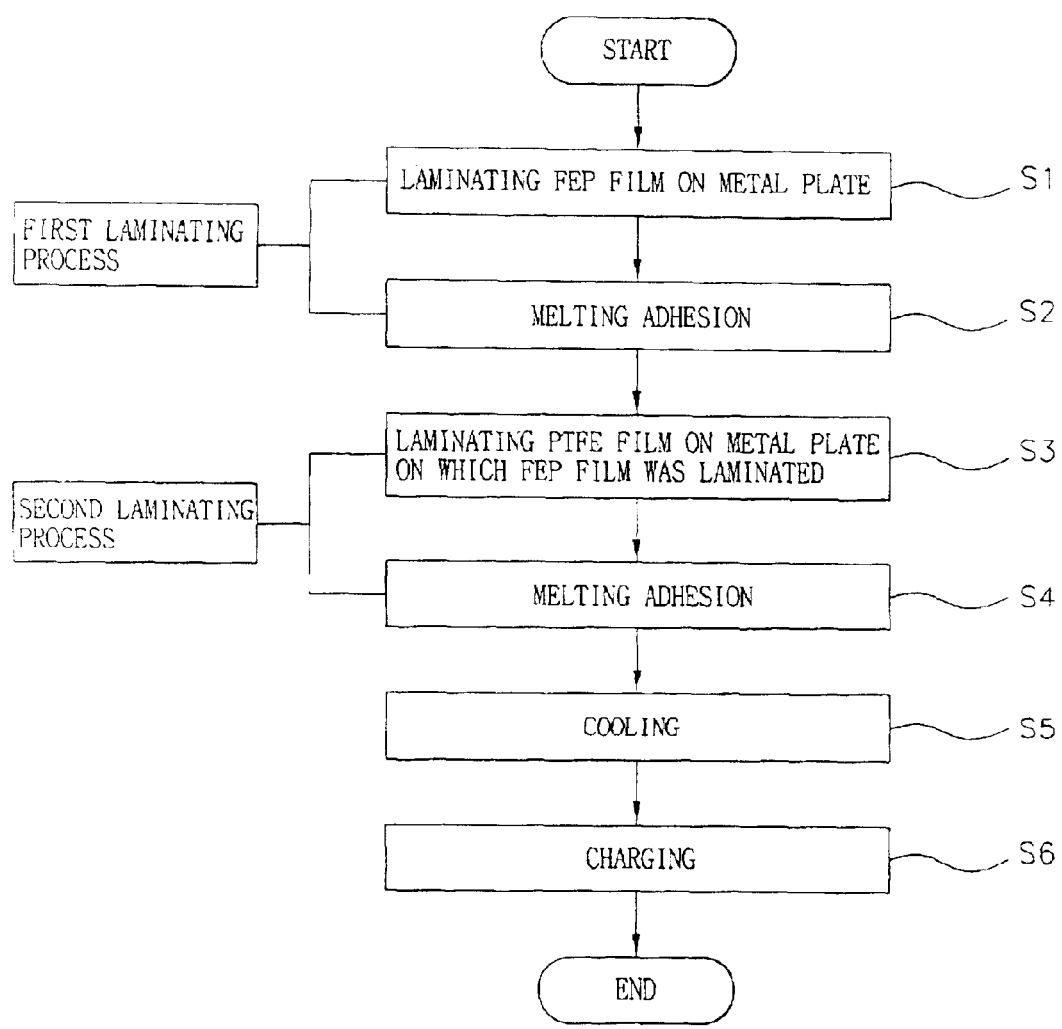
FIG. 4 is a flow chart of showing a manufacturing process of a multi-layer electret according to the present invention.
Figure 5:
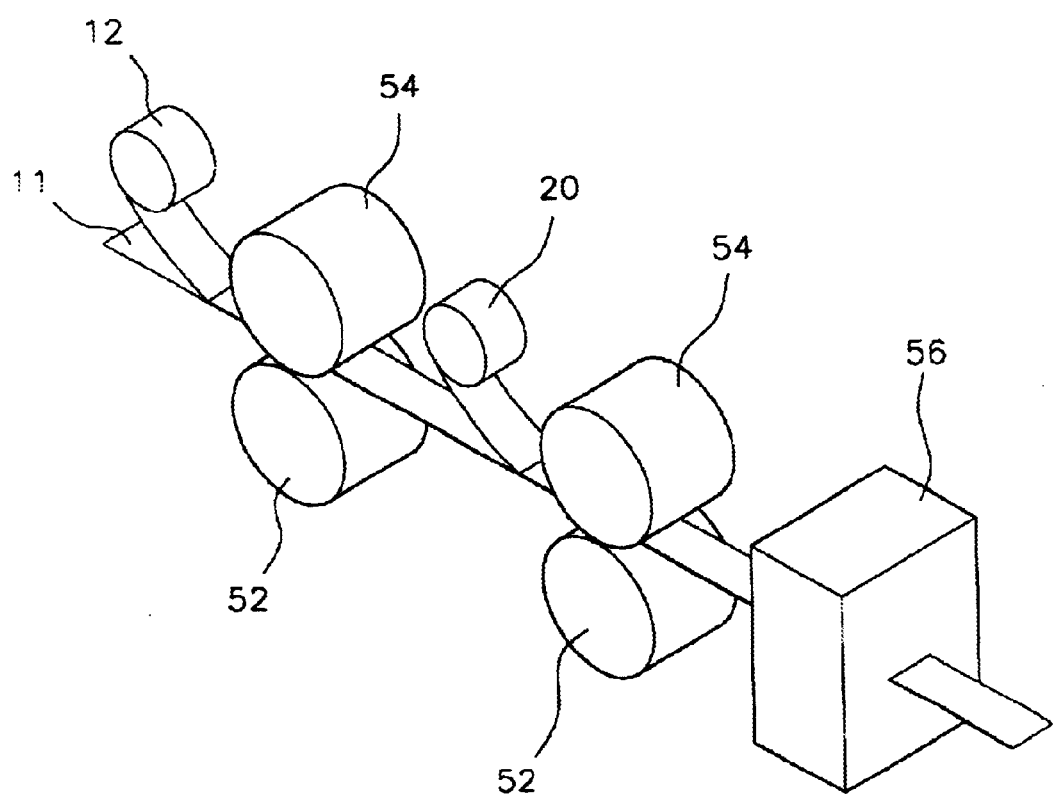
FIG. 5 illustrates the manufacturing concept of a multi-layer electret according to the present invention.

FIG. 4 is a flow chart for showing a manufacturing process of a multi-layer electret according to the present invention, and FIG. 5 illustrates the manufacturing concept of a multi-layer electret according to the present invention.

In general, melting-adhesion of a metal plate and a thin film is made by laminating process. The PTFE film doe not adhere to a metal plate well because its melting point is about 327° C. that is relatively high. In addition, charge stability of the electret is remarkably decreased because strong pressure and heat are applied to the PTFE film during laminating operation even if the PTFE film is attached onto the metal plate. Therefore, the present invention attaches the FEP film onto a metal plate in advance, and then attaches the PTFE film onto the FEP film, to thereby construct a multi-layer electret. FEP and PTFE that are the same fluoro-group have strong adhesiveness when being applied with heat and pressure. The multi-layer polymer electret in which the PTFE film is attached onto the FEP film has ultra-high charge stability. The PTFE film has ultra-high charge stability because its crystallinity is high, as described above. High crystallinity means existence of a large quantity of grain boundaries inside the material of the film. These grain boundaries become passages through which electrons can move in volume during charging or become trapping sites at which the electrons are stably trapped. Therefore, the electrons are left inside the material with stability so that charge stability of the electret can be increased.

Referring to FIGS. 4 and 5, the manufacturing process of a multi-layer electret according to the present invention includes a first laminating step S1 and S2 for laminating an FEP film on a metal plate, a second laminating step S3 and S4 for laminating an PTFE film on the FET film, a cooling step S5, and a charging step S6.

In the first laminating step, as shown in FIG. 5, the FEP film 12 is laminated on the metal plate 11 and melting-adhere to the metal plate while passing between an induced heating roller 52 and a pressurizing roller 54. The thickness of the FEP film is preferably 12.5~25 μm.

Specifically, after the FEP film 12 rolled is unrolled and laminated on the metal plate 11 in the step S1, the laminated structure is caused to pass between the rollers while being heated by the induced heating roller 52 disposed under the metal plate 11 and simultaneously being pressurized by the pressurizing roller 54, whereby the FEP film 12 melting-adhere to the metal plate 11, in the step S2. It is preferable that pressure applied by the pressurizing roller 54 is 10 Kg~100 Kgf approximately and a heating temperature according to the induced heating roller 52 is 330° C.~400° C. When heating process at a high temperature and pressurizing process are simultaneously performed as described above, all of the portion where the FEP film and the metal plate come into contact with each other is melted whereas local parts inside the FEP film is melted.

The second laminating step is carried out, as shown in FIG. 5, in such a manner that a rolled PTFE film 20 is laminated on the FEP film 12 that has melting-adhered to the metal plate 11 in the first laminating step, and the PTFE film melting-adheres to the FEP film 12 while passing between the induced heating roller 52 and the pressurizing roller 54. The thickness of the PTFE film is preferably 30 μm~100 μm.

Specifically, after the rolled PTFE film 20 is unrolled and laminated on the FEP film 12 attached onto the metal plate 11 in the step S3, the resulting structure passes between the rollers while being heated by the induced heating roller 52 disposed under the metal plate 11 and simultaneously being pressurized by the pressurizing roller 54, whereby the PTFE film 20 melting-adheres to the FEP film 12 attached onto the metal plate 11, in the step S4. It is preferable that pressure given by the pressurizing roller 54 is 30 Kgf~150 Kgf approximately and a heating temperature according to the induced heating roller 52 is 400° C.~500° C.

A contact surface of the metal plate and the film or a contact surface of the two films is melted entirely or locally in the above-mentioned laminating steps. An interface at which amorphism and lattice of polymer do not accord with each other is formed by the local melting. This interface traps electrons so that charge stability of the electret can be improved by controlling the position and size of the interface.

In the step S5 of cooling the material after melting adhesion, a cooling speed is controlled so as to adjust the position and size of the above-mentioned interface. Subsequently, in the charging step S6, the laminated films are charged with charges. In a case where an electret is manufactured through a continuous process, it is preferable that a line transfer speed (operating speed) is 0.3 m/min~0.7 m/min.

As described above, according to the present invention, a multi-layer polymer electret made of an FEP film and a PTFE film is manufactured using polymer so that excellent workability can be attained and manufacturing cost can be reduced due to very simple manufacturing processes. In addition, charge stability of the electret is improved because the PTFE film has a lot of grain boundaries thereinside owing to its high crystallinity. This makes it possible fabrication of a microphone that can be processed by SMT. Furthermore, reliability of an electret condenser microphone (ECM) is considerably increased.

Moreover, since the shape of the multi-layer polymer electret is similar to that of a back electret used for a conventional electret condenser microphone, all the conventional electret condenser microphones can be manufactured by SMT process.

Although specific embodiments including the preferred embodiment have been illustrated and described, it will be obvious to those skilled in the art that various modifications may be made without departing from the spirit and scope of the present invention, which is intended to be limited solely by the appended claims.

What is claimed is:

1. A method of manufacturing a multi-layer electret having ultra-high charge stability, comprising:

a first step of placing an FEP film on a metal plate;

a second step of heating the metal plate on which the FEP film was placed at a high temperature and applying high pressure thereto, whereby the FEP film and the metal plate melting-adhere to each other;

a third step of placing a PTFE film on the FEP film attached to the metal plate;

a fourth step of heating the metal plate on which the PTFE film and the FEP film were placed and applying high pressure thereto, whereby the PTFE film melting-adheres to the FEP film;

a fifth step of cooling the PTFE film and the FEP film placed on the metal plate, to accomplish an electret; and a sixth step of charging the cooled electret with charges.

2. The method according to claim 1, wherein in the fourth step pressurizing is performed by a pressurizing roller at pressure of 30 Kgf~150 Kgf approximately, and heating is carried out by an induced heating roller at a heating temperature of 400° C.~500° C.

3. The method according to claim 2, wherein the manufacturing method is executed at an operating speed of 0.3 m/min~0.7 m/min.

* * * * *